United States Patent Office 2,824,007
Patented Feb. 18, 1958

2,824,007

METHOD OF MAKING LOW SUGAR PECTINIC ACID GELS

Herbert Thal Leo and Clarence C. Taylor, Anaheim, Calif.

No Drawing. Application May 7, 1957
Serial No. 657,492

7 Claims. (Cl. 99—132)

This invention relates to a method of making low sugar pectinic acid gels, and more particularly to the making of such gels without the application of any heat to bring about gelling action.

In our copending application Serial No. 617,698, filed October 23, 1956, now Patent No. 2,801,178, we have described a method of making a low sugar pectinic acid by the action of enzymes derived from citrus fruit peel upon a pectin-aluminum coprecipitate, an acid aqueous pectin concentrate, or a high methoxyl pectin, initially in dry, discrete form, as the source material. Any of such source materials may be used in accordance with the present method, but it is preferable to start with a high methoxyl pectin in dry, discrete form. By the method disclosed in said application, a minimum methoxyl pectinic acid is produced that is not soluble in plain water but is easily dispersible therein, and is capable, upon the addition of a calcium sequestering agent, such as sodium hexametaphosphate, and of a solubilizing and buffering agent, such as sodium citrate, of forming a pectinic acid solution, which, upon adjustment of the pH thereof, forms gels with and without bivalent metal ions being present and with and without the addition of sugar. With the use, therefore, of such minimum methoxyl pectinic acid, it is possible to make gels, such as jams, jellies and desserts, using a low sugar content, by which term is meant a sugar content below about 50% by weight of the finished product, or even no sugar at all. Such products are, of course, very desirable from the standpoint of meeting the exacting requirements of weight control diets and the rigid restrictions on sugar in a diet for diabetics.

We have now found that if the minimum methoxyl pectinic acid is separately put into solution in the presence of a calcium sequestering agent and a solubilizing and buffering agent, the resulting solution can be added to the aqueous mass to be gelled, regardless of the dissolved solids content of the latter, and gelling effected without any application of heat to the resulting mixture. Previously, where the dry pectinic acid of the above described application was added to the aqueous mass to be gelled, it was thought necessary to apply heat in order to bring the pectinic acid into solution in the presence of the other ingredients of the mass, such as fruit, sugar and the like, but by first putting the minimum methoxyl pectinic acid into solution by itself, no subsequent application of heat is required. All that is necessary in order to effect the gelling action is to adjust the pH of the resulting mixture to a value at which gelling occurs. This pH value will depend upon the dissolved solids content of the resulting mixture, and will vary between about 2.50, as a minimum for water of practically zero dissolved solids content, to 5.00 for mixture having a dissolved solids content of about 65% or higher, but preferably between 2.75 as a minimum and 4.00 as a maximum pH.

The benefits and advantages of the present invention flow from the fact that no heat need be applied to the aqueous mass to be gelled, after the minimum methoxyl pectinic acid solution has been added thereto, since the omission of any heating step also obviates the necessity of any subsequent cooling step to effect the gelling action. Heretofore, using powdered pectinic acid not of our invention, it was absolutely necessary to heat the aqueous mass to be gelled to a boil, or nearly to a boil, in order to dissolve the pectinic acid, and, consequently, the whole mass had to be cooled down to a temperature at which gelling would occur. Where, however, the pectinic acid is already in solution, as in carrying out the method of our present invention, considerable time is saved in the making of gels by the elimination of any heating, and, consequently of any cooling steps. All that is required is to provide the aqueous mass that is to be gelled, which may be fruit in a syrup such as may be obtained in cans or by thawing a frozen fruit product, add the pectinic acid solution and then adjust the pH to the proper value at which gelling immediately occurs. The resulting saving in time is of great importance to the housewife or other operator in the making of gels that require no refrigeration for setting or keeping purposes.

It is therefore an important object of this invention to provide a novel and improved method of making gels, using a separately prepared solution of a low sugar pectinic acid such as a minimum methoxyl pectinic acid produced by the enzymatic treatment of pectin, using enzymes derived from citrus fruit peel.

It is a further important object of this invention to provide a quick method of making gels, without the application of heat to the mixture to be gelled, in accordance with which gelling is immediately effected, without the necessity of any cooling step, upon the adjustment of the pH of the resulting mixture to a value at which a gel-set takes place.

Other and further important objects of this invention will become apparent from the following description and appended claims.

In order that there may be a full description of our method of making the minimum methoxyl pectinic acid used in the method of our present invention, we are setting forth below the method of preparation in some detail and also a description of the low methoxyl pectinic acid so produced, and a description of our method for standardizing the same.

PREPARATION OF PECTIN

The high methoxyl pectin used as the starting material in this method is prepared from the pectin-aluminum coprecipitate by liberating the pectin from the coprecipitate in the manner described in our Patent No. 2,703,759, dated March 8, 1955. However, the dry high methoxyl pectin, instead of being ground to between 30 and 80 mesh, as in the patent referred to is preferably ground to a particle size of 30 mesh or coarser, such as between 10 and 30 mesh. We have found that the use of a high methoxyl pectin of 30 mesh or coarser as the starting material, greatly facilitates the carrying out of the enzymic action and the subsequent processing steps, such as filtering.

It will be understood that instead of starting with the high methoxyl pectin prepared from lemon peel, we may use orange peel as the source of the high methoxyl pectin, although generally pectin derived from orange peel is partially demethylated. In any case, the pectin used as the starting material should be of a particle size of 30 mesh or coarser and should be porous in character so that the enzyme solution will penetrate and wet the particles throughout. The porosity of the high methoxyl pectin particles is, of course, characteristic of our method of recovering pectin from the coprecipitate by the use of an acidified alcohol.

ENZYMIC TREATMENT OF THE HIGH METHOXYL PECTIN

A solution of an enzyme, herein termed pectase, is prepared by first mixing together washed comminuted orange peel, water, ordinary salt (NaCl), sodium bicarbonate and precipitated chalk at a temperature of around 90 to 120° F. in the following proportions:

660 gallons water
330 gallons peel
100 pounds salt
10 sodium bicarbonate
5 pounds chalk The amount of sodium bicarbonate added is sufficient to neutralize acidity in the peel to bring the pH to between 4 and 6, while the added chalk serves automatically to control the pH between about 6 and 7 during the several hours required to carry the enzymic action to completion. When the pH remains constant at about 6 without further addition of chalk, the reaction is considered complete. The pectase solution so produced is then drained or filtered from the peel and is ready for use in the treatment of the high methoxyl pectin.

The high methoxyl pectin, in a dry state, is added to the enzyme solution, prepared from orange peel in the manner just described, and chalk (calcium carbonate) and calcium chloride are added to give a mass having the following composition:

50 gals. of enzyme solution (preferably at about 130° F.)
12 lbs. of high methoxyl pectin (30 mesh or coarser)
4 lbs. of chalk
1 qt. of calcium chloride, as a 25% aqueous solution by weight The enzymic action is carried out at a temperature of around 100 to 120° F., keeping the mass violently agitated at the early stages of the reaction. This is necessary in order to thoroughly disperse the high methoxyl pectin. Thereafter, the mass is stirred, and any drop in pH below about 5.80 is made up by the addiiton of chalk, or chalk and a small portion of sodium bicarbonate, so as to maintain the pH at about 6, or between about 6 and 7.

After the enzymic action is complete, which requires up to about 6 hours, the suspension is pumped into a porous, double-walled unit such as one having holes sufficiently fine to prevent mechanical losses in pectin, and the pectin retained in the unit is water washed to remove excess chalk. Thereafter, the pectin is dropped into an agitator tank containing acidified 80–90% isopropyl, or other suitable alcohol, and the recovery of the minimum methoxyl pectinic acid is carried out by filtering or draining, re-mixing the minimum methoxyl pectinic acid with unacidified 90% alcohol until the pH of the alcohol medium has been raised to about 2 to 2.5 pH, and finally treating a dispersion of the minimum methoxyl pectinic acid in 90% alcohol with sufficient ammonia, in the form of a water solution thereof, to bring the pH of the pectinic acid to between 3 and 4. Ammonia alone may be used for this purpose. Sodium carbonate cannot be used because of its relative insolubility in 90% alcohol. The pH should not be carried higher than 4, since the resulting minimum methoxyl pectinic acid will then be so water soluble that it will clump badly when added to water to dissolve the same. If the pH of the recovered pectinic acid is below about 3, there is a tendency for it to be degraded during the subsequent drying operation.

After the pH of the final alcohol dispersion has been brought to a pH of between 3 and 4, the minimum methoxyl pectinic acid is in a relatively firm, coarsely particulate form that renders it easy to filter. Filtering is carried out preferably on a gravity type of filter without the use of applied pressure. One suitable type of filter is a double-walled vessel having an upper cylindrical portion and a lower conical portion, the inner wall of which is formed of perforated stainless steel sheet having openings of less than 1/16 inch diameter. The alcohol is allowed to filter through the perforations by gravity, to leave a matte of the pectinic acid particles against the surface of the wall. As the filtering continues, this matte continues to build up until the vessel is nearly full of the granular pectinic acid. Upon completion of the filtering, the mass is allowed to drain as free as is practical from alcohol.

The drained mass is then dumped into a vacuum drier provided with a slowly revolving agitator and dried free of alcohol under reduced pressure at a relatively low temperature below the normal boiling point of isopropyl alcohol. The dried product is then taken out of the drier, preferably in a stream of air that is passed through a centrifugal separator from which the powdered pectinic acid is recovered in a dry, loosely pulverent state. It is then passed through a grinding mill and screened to the desired degree of fineness, such as between 10 and 100 mesh, and preferably between 30 and 80 mesh. A perfectly white powder is thus obtained.

THE MINIMUM METHOXYL PECTINIC ACID OF OUR INVENTION

Preferably, the minimum methoxyl pectinic acid produced by our method is not soluble in water but can be readily dispersed in distilled water or in tap water containing not over 40 p. p. m. of calcium without clumping, to give a pH of between 3 and 3.5, but not over 4.

Our minimum methoxyl pectinic acid is substantially free from multi-valent metals and has an ash content of not over 4% by weight, and, usually, not over 3%, by weight, on a dry basis (constant weight at 105° C.). It has a minimum number of methoxyl groups by reason of the enzymic action having been carried to completion with our citrus enzyme, pectase. It is a low sugar type of pectinic acid in that it will gel upon adjusting the acidity to the proper pH with or without the addition of sugar. Specifically, if gelling is effected by the addition of acid to bring about a pH at which gelling takes place below the boiling point of the aqueous solution, either in the presence or absence or sugar, the gel produced is reversible in that it can be destroyed by heating and reformed by cooling. In the case of calcium or other multivalent metal gels, if the temperature of set, using our minimum methoxyl pectinic acid, is substantially below the boiling point, such gels are also reversible, but frequently, in the case of calcium gels the temperature of the set is above, or near the boiling point, and in such cases the gels can be considered non-reversible from any practical standpoint.

GEL STANDARDS FOR OUR MINIMUM METHOXYL PECTINIC ACID

Since ours is not a sugar-acid type of pectinic acid, it must be standardized by other yardsticks than the amount of sugar that it will gel. Instead, our pectinic acid is standardized in terms of the percentage of slump of the gels made therefrom with water, as measured on a standard instrument put out by California Fruit Growers Exchange and called a Ridgelimeter. When so measured, the percentage of slump indicates the acid susceptibility of the minimum methoxyl pectinic acid. A separate test is carried out to determine the calcium susceptibility, if that information is desired.

In order to carry out the acid susceptibility test, a standard minimum methoxyl pectinic acid mixture is prepared, using sodium hexametaphosphate as the calcium sequestering agent and potassium citrate as the solubilizing and buffering agent, and including anhydrous dextrose, or other substantially inert, water-soluble material as the diluent to bring the mixture up to a total of 100 parts by weight, or 100% by weight. The following composition is termed our standard minimum methoxyl pectinic acid dry mixture:

|                                   | Percent |
|-----------------------------------|---------|
| Pure minimum methoxyl pectinic acid | 10.0  |
| Potassium citrate                 | 8.5     |
| Sodium hexametaphosphate          | 6.5     |
| Anhydrous dextrose                | 75.0    |
|                                   | 100.0   |

In order to test the above standard dry mixture, 6 ounces, or 170 grams, of this dry mixture is dissolved in tap water (about 36 fluid oz.) in order to make up a standard aqueous solution of the minimum methoxyl pectinic acid of 40 fluid oz., or 1120 cc. This aqueous solution is hereinafter sometimes referred to as our standard liquid pectin, and it is this solution that is used in establishing the slump test standards by the use of the Ridgelimeter.

One pint of the standard liquid pectin having the composition above given is heated to a boil, maintaining a constant weight by the addition of water, if necessary, and the resulting boiling pectin solution is then poured into two jelly glasses (standard 6 oz. glass jars), one containing 10 cc. and the other containing 12 cc. of 50 wt. percent citric acid solution. The balance of the boiling liquid pectin is poured into a glass not containing any acid.

The glasses are prepared in such a way that shrinkage of the solution upon cooling is possible, yet a glass-full of gel results. This is accomplished by winding a length of a pressure sensitive transparent tape about the top of each glass to build up the height thereof, before pouring the proportions of gel solution into the glasses. Then, after the gels have set, the tapes are removed and the gel in each glass trimmed off even with the rim thereof by means of a wire trimmer. Thus, when the gels are turned out, they are the exact height initially of the glasses. The glasses are allowed to stand over night, or for 12 hours, at about room temperature (67° F.). The gels so produced in the two glasses containing the acid are turned out onto plane surfaces and are measured on the Ridgelimeter exactly 30 seconds after being turned out.

With a minimum methoxyl pectinic acid of standard strength, approximately the following readings will be obtained:

| Glasses | cc.—50% Citric Acid Solution | Ridgelimeter Reading, degrees | pH Reading |
|---------|------------------------------|-------------------------------|------------|
| #1      | 10                           | 12                            | 3.20–3.35  |
| #2      | 12                           | 9                             | 3.00–3.20  |

The pH of the standard liquid pectin is initially between 4.90 and 5.30. With the pH of the standard liquid pectin between these limits, the addition to the jelly glasses of 11 cc. and 12 cc., respectively, of a 50% citric acid solution result in the pH readings above indicated. In general, an acid type gel can be prepared by the use of our minimum methoxyl pectinic acid if the pH is adjusted to between 2.75 and 3.50, but in standardizing our minimum methoxyl pectinic acid mixture, we prefer to adjust the pH readings to substantially those given in the above table so as to eliminate variables and thereby obtain consistently comparable slump readings on the Ridgelimeter.

In testing a minimum methoxyl pectinic acid of unknown quality against the standard minimum methoxyl pectinic acid dry mixture, if the slump readings on the Ridgelimeter are numerically higher, thereby indicating a gel of less firmness, the minimum methoxyl pectinic acid content is increased, as compared with the standard dry mixture, and the dextrose content is correspondingly decreased. The increases in the minimum methoxyl pectinic acid content in the dry mix is conveniently made in increments of 10% until gels produced by the standard procedure above outlined are in all respects comparable to the standard gels. For instance, if 10% more of the minimum methoxyl pectinic acid were included in the dry mixture, the percentages would be as follows:

|                                   | Percent |
|-----------------------------------|---------|
| Pure minimum methoxyl pectinic acid | 11.0  |
| Potassium citrate                 | 8.5     |
| Powdered sodium hexametaphosphate | 6.5     |
| Anhydrous dextrose                | 74.0    |
|                                   | 100.0   |

The gel tests in accordance with the standard procedure above outlined would then be carried out and a comparision made with the slump and pH readings given above in the standard test. Additional comparative tests with the standard would be made, if necessary, with further 10% increases in the minimum methoxyl pectinic acid content of the dry mix until a mix was obtained that would substantially equal the standard acid-type gel slump test readings on the Ridgelimeter given in the table above. In a similar way, if minimum methoxyl pectinic acid undergoing test for acid-type gel strength produced a gel, using the standard procedure, that was substantially firmer than the standard gel, that is, showed less slump on the Ridgelimeter, the minimum methoxyl pectinic acid content would be reduced in 10% increments until gels were produced matching the standard gels.

We have found that our minimum methoxyl pectinic acid can be produced with almost no variation in gel strength from that which we have termed above "a minimum methoxyl pectinic acid of standard strength." Consequently, we usually do not need to adjust the composition but obtain directly our standard minimum methoxyl pectinic acid dry mixture by the use of 10% pure minimum methoxyl pectinic acid such as is consistently produced by the process above described.

Our standard minimum methoxyl pectinic acid dry mixture is such that one-half oz. (14.2 grams) dissolved in a pint (16 fluid oz.) of distilled water will form a gel upon the addition of the required amount of acid meeting the above described standard gel requirements.

UNIVERSAL GEL TYPE LOW METHOXYL PECTINIC ACID COMPOSITION

In order to use our low methoxyl pectinic acid in the making of gels of any type, whether calcium, acid-sugar or simply acid type, we have found it preferable to incorporate with the pectinic acid definite amounts of an alkali metal hexametaphosphate, such as sodium hexametaphosphate, and of an alkali metal salt of an organic oxy acid, such as sodium citrate (or other calicum sequestering and combined solubilizing and buffering agents, respectively) within the following weight percentages based upon the dry weight of pectinic acid:

| Additive | Broad Ranges, percent | Preferred Ranges, percent |
|----------|-----------------------|---------------------------|
| Sodium hexametaphosphate | 5–75        | 15–65                     |
| Sodium citrate           | 10–100      | 20–80                     |

Our standard dry mixture contains preferred proportions of sodium hexametaphosphate and potassium or sodium citrate within the above given preferred ranges. All of the ingredients of our standard dry mixture are preferably of uniform mesh size so that the dry mixture remains homogeneous during shipment and storage. While, as previously indicated, in accordance with the present invention, we use a prepared solution of our minimum methoxyl pectinic acid composition, it is, of course, frequently desirable to ship and store the composition in dry form so as to reduce the shipping charges to a minimum and avoid deterioration or degradation of the composition until such time as it is to be used.

Our standard liquid pectin of the composition given above is used in the recipes hereinafter set forth. In this standard liquid pectin, or any equivalent solution of our minimum methoxyl pectin that may be used in place thereof, the dissolved solids content is preferably approximately 16% since a 16% solution is most convenient, but the solids content should be below about 20% and above about 10% by weight of the solution. The pH value of the resulting solution may vary between 4.90 and 5.50, depending upon the pH of the water used. Either cold or warm water is employed to dissolve the pectinic acid composition in the first instance.

Within this pH range and with the salts present in solution along with the minimum methoxyl pectinic acid, the resulting solution is quite stable without the addition of any preservative, such as benzoate of soda, and with merely ordinary refrigeration (40° to 50° F.). If the solution is to be kept or stored at room temperature, it is preferable to add 0.1% by weight of benzoate of soda. Such addition does not affect the pH values materially and yet keeps the solution perfectly.

RECIPES USING OUR MINIMUM METHOXYL PECTINIC ACID COMPOSITION

It is convenient for the housewife to have the pectinic acid composition so standardized in dry powdered form that it can be measured out in level tablespoonfuls in making up solutions therefrom. In all of the recipes given below, there is the following relationship between a tablespoonful of our powdered minimum methoxyl pectinic acid composition and the solution made therefrom:

1 tablespoon of powder=¼ cup, or 2 fl. oz. of pectinic acid solution
2 tablespoons of powder=½ cup, or 3 fl. oz. of pectinic acid solution
3 tablespoons of powder=¾ cup, or 6 fl. oz. of pectinic acid solution
4 tablespoons of powder=1 cup, or 8 fl. oz. of pectinic acid solution Thus, where cups, or fractions thereof, of the pectinic acid solution are referred to in the following recipes, the corresponding dry weights of the minimum methoxyl pectinic acid composition to be used can be readily found by reference to the above table. It is a characteristic of our minimum methoxyl pectinic acid solutions that, once a solution is complete, it can be converted into a gel merely by adjusting the pH to the proper value, as by the addition of lemon juice, depending upon the solids content. For a minimum solids content of between 10 and 20%, which is a preferred range for our minimum methoxyl pectinic acid solutions, the minimum pH required for effecting gelling is between 2.75 and 3.10. After addition of our pectinic acid solution to an aqueous dispersion or mass of the edible material to be gelled, the minimum pH value required for effecting the gelling action will depend upon the percent by weight of total dissolved solids content in the final mixture, and will, in general, correspond with the pH values shown in the following table:

| Percent solids: | pH (minimum) |
|---|---|
| 65 | 4.00 |
| 50 | 3.50 |
| 40 | 3.30 |
| 20 | 3.10 |

The following examples will serve to illustrate the application of our method to the preparation of a variety of different gels:

*Example I*

In making preparations from frozen berries, or other fruit, the frozen fruit is first thawed thoroughly to give a mass of the fruit in its accompanying syrup, which contains in solution the sugar used in packing the fruit. In general, a standard 10 oz. package of frozen berries, upon thawing, will give a mass having a total dissolved solids content of about 25% by weight. The following recipes are typical:

For shortcake or sauce:
1–10 oz. package of frozen berries and sugar
¼ cup of our standardized minimum methoxyl pectinic acid solution
1 tablespoon lemon juice For tart or pie filling:
1–10 oz. package frozen berries and sugar
½ cup of sugar
¼ cup of standardized minimum methoxyl pectinic acid solution
1 to 2 tablespoons of lemon juice For "cup for cup" jams
1–10 oz. package of frozen berries and sugar
1 cup of sugar
¼ to ⅓ cup of our standardized minimum methoxyl pectinic acid solution
2 to 4 tablespoons of lemon juice In making up any of these recipes, the berries are first completely thawed and, if sugar is called for, sugar is stirred into the thawed berries. Next, the standardized pectinic acid solution is added, and then the lemon juice. The order of addition of the pectinic acid solution and the lemon juice (or acid) is not important, and in some instances it is preferable to add the lemon juice before the pectin, particularly where the pH value of the fruit mass, before acid addition, is around 3.25 to 3.50. Under those conditions, the addition of the lemon juice before the pectin makes for a smoother gel because the acid is not pin-pointed to cause a pre-set.

In making a pie filling or jam in accordance with the foregoing recipes, it is best to warm the fruit and sugar to around 110° F., which is a temperature not uncomfortable to one's finger, in order to dissolve the sugar. Such warming, however, is not necessary, and in the interest of reducing the time of the operation, no application of heat after addition to the fruit mass of the standardized pectinic acid solution should ever be used.

The same simple procedure as that just described may be applied to any of the canned fruits, packed in syrup, that are available on all grocery shelves. These cans are usually of 16 oz. capacity and contain fruits such as apricots, peaches, blueberries, cherries, pineapple and berries of all varieties.

*Example II.—Using canned fruit in syrup*

The contents of a 16 oz. can of fruit in syrup are poured into a bowl and sugar added to taste. In connection with the following proportions, the lemon juice is stirred in first, and then the standardized pectinic acid solution, or the order may be reversed.

1–16 oz. can of fruit in syrup
0–½, or up to 1 cup of sugar
¼–½ cup of pectinic acid solution
2–4 tablespoons of lemon juice When the standardized minimum methoxyl content pectinic acid solution is added in making up any of the foregoing recipes, the pH of resulting mass ranges from about 3.80 to 4.40. Since no gelling action takes place at a pH value numerically above 4.0, an acid, such as lemon juice, is almost always necessary to bring about a gelling action. Of course, other acid solutions, such as citric, tartaric or phosphoric may be used, providing proper pH values are produced.

*Example III.—Calcium type gels*

When making milk custards, heat must be applied to the mass because of the fact that this type of dessert depends upon the reaction between calcium, or other bivalent metal ions, and the low methoxyl content pectinic acid to effect a gel, and the temperature of set is usually comparatively high, being in the neighborhood of the boiling point of the mass. The standardized minimum methoxyl pectinic acid solution is added last in the case of milk custards.

The thickening of chocolate syrup also depends upon a bivalent metallic ion reaction, in this case upon the presence of calcium or magnesium in the cocoa. The following is a satisfactory recipe for a chocolate gel:

1 level cup breakfast cocoa (Hershey)
1½ level cups of sugar plus a dash of salt
1 cup of boiling water
½ cup of our standardized minimum methoxyl pectinic acid solution
1 tablespoon of vanilla In making up this recipe, the dry ingredients are mixed well and then boiling water added. Any lumps should be broken up with an egg beater. The vanilla flavor is added at the end of any beating operation. Thereafter, the standardized minimum methoxyl pectinic acid solution is stirred into the mass. After the mass has been cooled, it will set up to a soft, pasty-like consistency. For ice cream topping, the thickened chocolate preparation can be diluted with corn syrup in equal proportions, or it may be used as it is to coat cookies or cup cakes.

While a heating step is required in connection with the making of gels formed by the reaction between bivalent metallic ions and our minimum methoxyl pectinic acid, no heating step is necessary in the making of the acid type or the acid-sugar types of gels, and heating is never required in order to effect a concentration of the solids content of the mass to be gelled. This is very important in the case of fruits or other edible substances depending upon volatile flavors, esters or the like for their taste appeal, since in the ordinary methods of making jellies the step of boiling to bring the masses to a 65% sugar concentration, or higher, invariably results in the loss of some of these more volatile components. Since there is never any loss due to boiling, the gels prepared in accordance with the method of our present invention have a final volume closely corresponding with the total volume of the component liquid ingredients. The total dissolved solid contents of the final gel is also that which corresponds with the dissolved solids contents of the liquid components used, since even if heating is used, temperatures are employed below the boiling point and no substantial concentration of the solids content is ever necessary, or even desirable.

From the foregoing, it will be appreciated that we have provided a very unusual and novel method of making gels of various types, including straight acid, sugar-and-acid, and calcium gels. In the case of gels formed with water alone by the proper adjustment of the pH, such gels, if formed at a temperature of set below the boiling point, are reversible in that upon being heated to a temperature above the temperature of set, they lose their set, only to regain their gel consistency upon cooling again to below the temperature of set. This same phenomenon is observed when sugar is present, provided the temperature of set is below the boiling point of the sugar solution. But in the case of calcium gels, the phenomenon does not hold true; such gels are irreversible.

The term "minimum methoxyl pectinic acid," as used herein and in the claims, distinguishes our product from heretofore known low methoxyl pectinic acids by designating a pectinic acid having the minimum number of methoxyl groups that can be obtained solely as a result of enzymic action where the pectin is one obtained from citrus peel and the enzyme used in pectase, also derived from citrus peel, and the enzymic action is carried out under pH conditions initiated and maintained essentially because of the presence in the reaction mass of an excess of a metal carbonate selected from the group consisting of calcium and magnesium carbonates. Under these conditions there appears to be no degrading of the pectinic acid and therefore no loss of its gelling powers. And surprisingly, unlike heretofore known low methoxyl pectinic acids, ours requires no calcium or other multi-valent cations to form a gel. The term "gel" is used herein instead of jelly because the latter term is restricted to a gel requiring at least 65% of sugar in the final composition in order to effect a set upon the adjustment of its acidity to the proper pH.

While our minimum methoxyl pectinic acid can be used to form high as well as low sugar "jellies," and is intended for such purposes, it can also be used with fruit or other flavoring substances in the substantial absence of any sugar at all to give masses of any degree of viscosity up to firm gels of pleasing texture, and also to give "jelly" or jam-like products of any desired consistency or viscosity merely by proper adjustment of the pH in relation to the soluble solids content of the mass to be prepared. The term "low sugar" gels is meant to include gelled masses containing from 0 to about 50% total dissolved solids content. For diabetic diets, the low sugar gels of our invention will have a dissolved solids content of from about 5 to 15% by weight, with little or no sugar, while for low caloric diets, the dissolved solids content may run as high as 30% by weight. Consequently, for the major purposes for which our gels are intended, the total dissolved solids content of the finished gels will lie within the range of 5 to 30% by weight of the gels.

This is a continuation-in-part of our copending application Serial No. 517,388, filed June 22, 1955, now abandoned.

It will be understood that modifications and variations may be effected without departing from the scope of the novel concepts of the present invention.

We claim as our invention:

1. The method of making a gel from a minimum methoxyl pectinic acid formed from pectin obtained from citrus peel by the action therein of a citrus peel-derived pectase carried to completion which comprises separately dissolving said pectinic acid in water in the presence of an alkali metal salt of an edible organic oxy acid and an alkali metal hexametaphosphate to produce a pectinic acid solution having a pH between 4.9 and 5.5 and a dissolved solids content of about 10–20% by weight, without boiling to concentrate the same forming an aqueous mass of an edible substance to be gelled, adding said pectinic acid solution to said aqueous mass at a temperature below the boiling point, and without heating to concentrate the resulting mixture adjusting the pH thereof between 2.75 and 4.0 to effect gelling thereof; the higher the dissolved solids content of said resulting mixture up to 65% total dissolved solids content the higher should be said adjusted pH between said limits of 2.75 to 4.0 and vice versa.

2. The method of making a gel from a minimum methoxyl pectinic acid formed from pectin obtained from citrus peel by the action therein of a citrus peel-derived pectase carried to completion which comprises separately dissolving said pectinic acid in water in the presence of an alkali metal salt of an edible organic oxy acid and an alkali metal hexametaphosphate to produce a pectinic acid solution having a pH between 4.9 and 5.5 and a dissolved solids content of about 10–20% by weight, without boiling to concentrate the same forming an aqueous dispersion of a fruit substance containing not over about 50% total dissolved solids to be gelled, adding said pectinic acid solution to said aqueous dispersion at a temperature below the boiling point, and without heating to concentrate the resulting mixture adjusting the pH thereof between 2.75 and 3.50 to effect gelling thereof.

3. The method of making a gel from a minimum methoxyl pectinic acid formed from pectin obtained from citrus peel by the action thereon of a citrus peel-derived pectase carried to completion, which comprises separately dissolving said pectinic acid in water in the presence of an alkali metal salt of an edible organic oxy acid and an alkali metal hexametaphosphate to produce a pectinic acid solution having a pH between 4.9 and 5.5 and a dissolved solids content of about 10–20% by weight, without boiling to concentrate the same forming an aqueous dispersion of a fruit substance and sugar having a total dissolved solids content not over about 30% by weight to be gelled, adding said pectinic acid solution to said aqueous dispersion at a temperature below the boiling point, and without heating to concentrate the resulting mixture adjusting the pH thereof between 2.75 and 3.50 to effect gelling thereof.

4. The method of making a low sugar gel from a minimum methoxyl pectinic acid obtained from citrus pectin by enzymic action thereon of a citrus peel-derived pectase carried to completion, which comprises separately dissolving said pectinic acid in water in the presence of a sufficient proportion of an alkali metal salt of an edible oxy organic acid to serve as a solubilizing agent therefor and of an alkali metal hexametaphosphate to serve as a calcium sequestering agent, to produce a pectinic acid solution having a pH between 4.9 and 5.5 and a total dissolved solids content of not over about 20% by weight, said solution being capable of forming a gel upon the adjustment of said solution to a pH of 2.75 in the substantial absence of both bivalent metal ions and sugar, forming an aqueous mass of a fruit substance having a total dissolved solids content of not over 30% by weight, adding said pectinic acid solution to said mass without thereafter heating the resulting mixture, and adjusting the pH of said resulting mixture to between 2.75 and 3.50 to effect gelling thereof at a total dissolved solids content of not over 30% by weight.

5. The method of making a low sugar gel from a minimum methoxyl pectinic acid obtained from citrus pectin by the action thereon of citrus pectase carried to completion, which method comprises separately dissolving said pectinic acid in water in the presence of a solubilizing and buffering agent and a calcium sequestering agent to produce a pectinic acid solution having a dissolved solids content between 10 and 20% by weight and capable of forming a gel upon the adjustment of said solution to a pH of 2.75 in the substantial absence of both multivalent cations and sugar, forming an aqueous mass of an edible substance having a total dissolved solids content of between 5 and 30% by weight, adding said pectinic acid solution to said mass without thereafter applying heat to the resulting mixture, and adjusting the pH of said resulting mixture to between 2.75 and 3.50 while the same has a total dissolved solids content of between 5 and 30% by weight, whereupon gelling thereof immediately takes place without cooling the same.

6. The method of making a gel from a minimum methoxyl pectinic acid formed from pectin obtained from citrus peel by the action thereon of a citrus peel-derived pectase carried to completion, which comprises separately dissolving said pectinic acid in water in the presence of from 5 to 75% of sodium hexametaphosphate and from 10 to 100% of sodium citrate by weight of the dry pectinic acid to produce a pectinic acid solution having a pH between 4.9 and 5.5 and a dissolved solids content of about 10 to 20% by weight, without boiling to concentrate the same forming an aqueous dispersion of an edible substance to be gelled, adding said pectinic acid solution to said aqueous dispersion at a temperature below the boiling point and without heating to concentrate the resulting mixture adjusting the pH thereof between 2.75 and 4.0 to effect gelling thereof, the addition of the pectinic acid solution and the adjusting of the pH of the resulting mixture taking place in either order; the higher the dissolved solids content of said resulting mixture up to 65% total dissolved solids content the higher should be said adjusted pH between limits of 2.75 and 4.0 and vice versa.

7. The method of making a low sugar gel from a minimum methoxyl pectinic acid obtained from citrus pectin by the enzymic action thereon of a citrus peel-derived pectase carried to completion, which comprises separately dissolving said pectinic acid in water in the presence of from 15 to 65% of sodium hexametaphosphate and from 20 to 80% of sodium citrate by weight of the dry pectinic acid to produce a pectinic acid solution having a pH between 4.9 and 5.5 and a total dissolved solids content of not over about 20% by weight, said solution being capable of forming a gel upon the adjustment of said solution to a pH of 2.75 in the substantial absence of both bivalent metal ions and sugar, forming an aqueous mass of a fruit substance having a total dissolved solids content of not over 30% by weight, adding said pectinic acid solution to said mass without thereafter heating the same, and adding an edible fruit acid to said mass to bring the pH thereof to between 2.75 and 3.50, the addition of the pectinic acid solution and of said acid being in either order provided that the pH of the final mixture is between 2.75 and 3.50 to thereby effect gelling thereof at a total dissolved solids content of not over 30% by weight.

References Cited in the file of this patent
UNITED STATES PATENTS

| | | |
|---|---|---|
| 2,207,299 | Mnooking | July 9, 1940 |
| 2,483,550 | Leo et al. | Oct. 4, 1949 |
| 2,703,757 | Leo et al. | Mar. 8, 1955 |